(12) United States Patent
Carberry et al.

(10) Patent No.: US 6,278,821 B1
(45) Date of Patent: Aug. 21, 2001

(54) SEGMENTED CANE MACH-ZEHNDER INTERFEROMETER

(75) Inventors: Joel P. Carberry, Horse Heads; Mark F. Krol, Painted Post; William J. Miller; Mark L. Morrell, both of Horse Heads, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/374,738

(22) Filed: Aug. 13, 1999

(51) Int. Cl.⁷ .............................. G02B 6/26; G01B 9/02; G03B 37/023
(52) U.S. Cl. .............................. 385/39; 385/42; 385/43; 385/51; 385/123; 356/345; 65/385; 65/406; 65/408
(58) Field of Search .............................. 385/1, 2, 37, 39, 385/41, 42, 43, 46, 51, 48, 123; 356/345; 65/385, 406, 408, 409, 410, 411, 412

(56) References Cited

U.S. PATENT DOCUMENTS

| | | | |
|---|---|---|---|
| 4,814,297 | | 3/1989 | Beall et al. ........................ 501/7 |
| 5,011,251 | * | 4/1991 | Miller et al. ........................ 385/43 |
| 5,119,453 | * | 6/1992 | Gonthier et al. ........................ 385/43 |
| 5,131,735 | * | 7/1992 | Berkey et al. ........................ 385/43 |
| 5,208,883 | * | 5/1993 | Hattori et al. ........................ 385/43 |
| 5,240,489 | * | 8/1993 | Robson ........................ 65/4.2 |
| 5,268,979 | * | 12/1993 | Weidman ........................ 385/42 |
| 5,295,205 | | 3/1994 | Miller et al. ........................ 385/1 |
| 5,295,210 | * | 3/1994 | Nolan et al. ........................ 385/43 |
| 5,351,325 | | 9/1994 | Miller et al. ........................ 385/42 |
| 5,404,415 | * | 4/1995 | Mori et al. ........................ 385/43 |
| 5,479,546 | * | 12/1995 | Dumais et al. ........................ 385/43 |
| 5,479,548 | * | 12/1995 | Cote et al. ........................ 385/51 |
| 5,664,037 | * | 9/1997 | Weidman ........................ 385/46 |
| 5,703,975 | | 12/1997 | Miller et al. ........................ 385/16 |

* cited by examiner

*Primary Examiner*—Brian Healy
(74) *Attorney, Agent, or Firm*—Harness, Dickey & Pierce, P.L.C.

(57) ABSTRACT

A Mach-Zehnder interferometer for performing an optical function on a plurality of optical fibers is provided. The interferometer includes a first cane segment surrounding the optical fibers. The first cane segment forms a first optical coupling region. The interferometer also includes a second cane segment surrounding the optical fibers. The second cane segment forms a second optical coupling region. A phase shift region is formed by a discontinuity between the first and second cane segments for exposing the optical fibers. The optical fibers are suspended between the first and second cane segments within the phase shift region. A substrate is provided for supporting the optical fibers within the phase shift region.

23 Claims, 4 Drawing Sheets

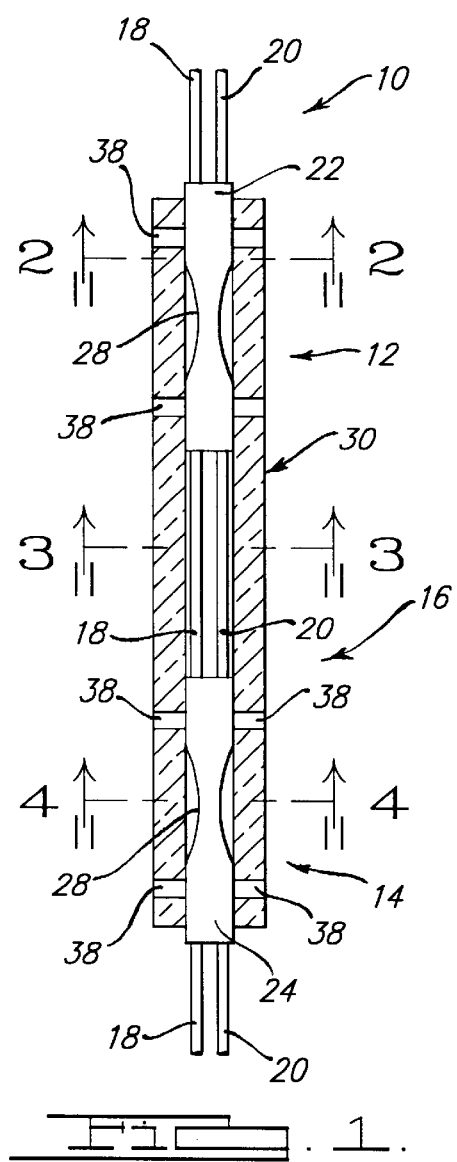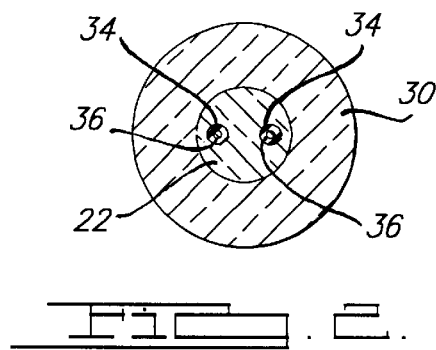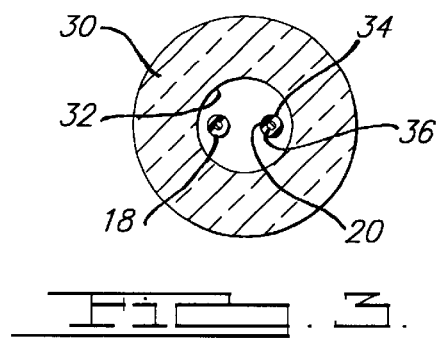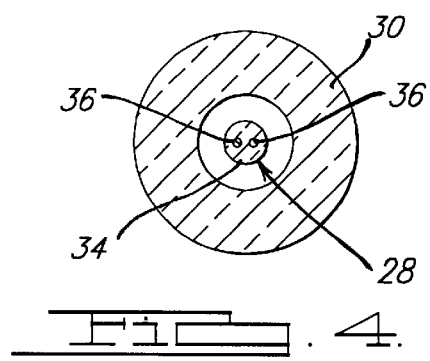

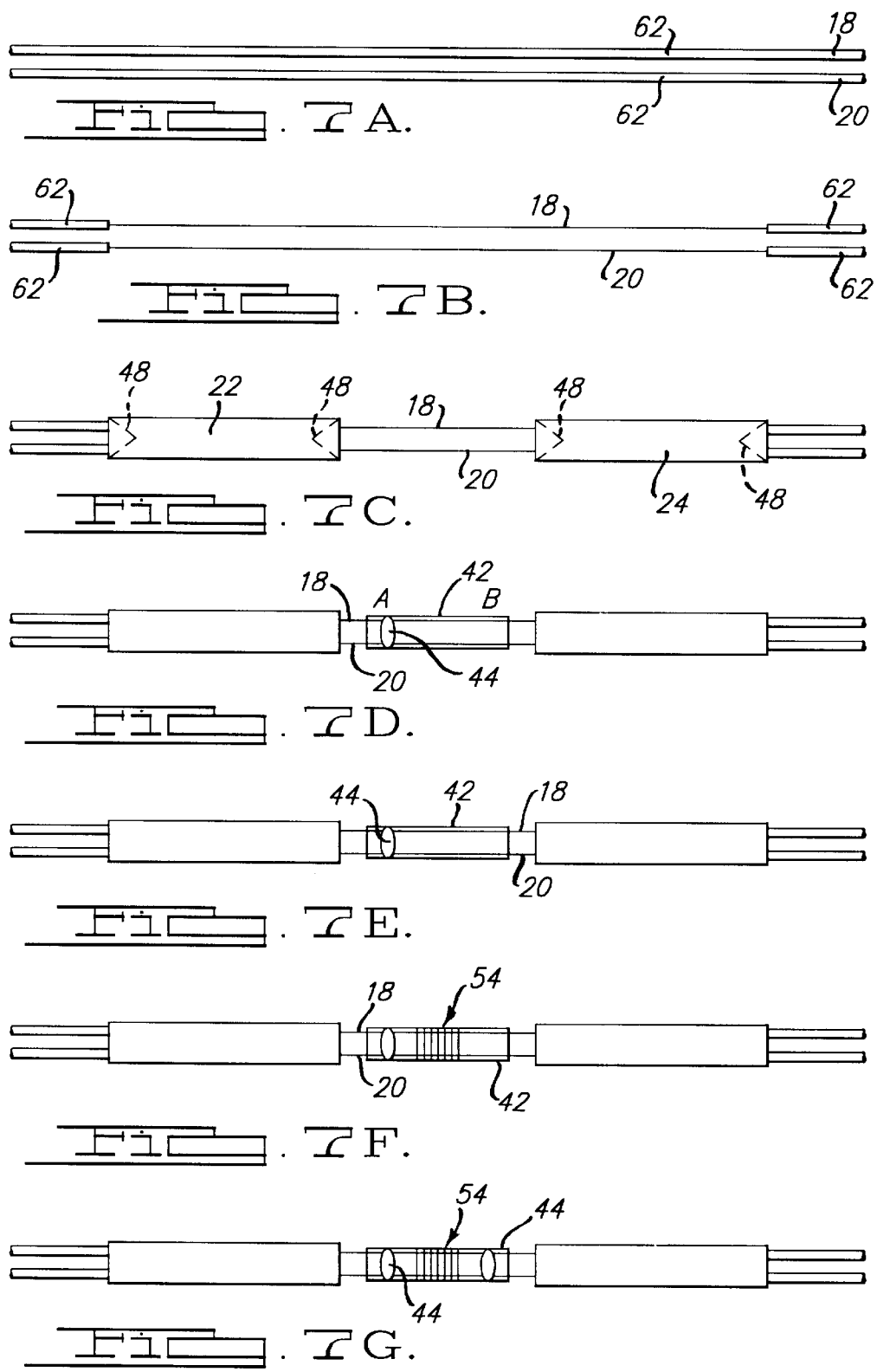

SEGMENTED CANE MACH-ZEHNDER INTERFEROMETER

BACKGROUND OF THE INVENTION

1. Field of the Invention

The present invention relates generally to a Mach-Zehnder interferometer for an optical communication system. More particularly, the present invention is directed to a Mach-Zehnder interferometer, formed from segmented cane structures, which provides access to the constituent optical fibers during the fabrication process.

2. Technical Background

There is an emerging need for narrowband wavelength division multiplexing (WDM) couplers and filters. Such optical devices are needed in the 1550 nm window for modifying the gain spectrum of erbium fiber amplifiers. These devices will also be widely used in trunk lines as well as in fiber-to-the-subscriber communication architectures. When used in these applications, these optical devices will need to be environmentally stable, unaffected by large temperature changes, and very reliable.

There is also a need for both wavelength tunable optical devices and fixed wavelength optical devices. In an all optical network, for example, the optical device can be tuned at the receiver end in order to detect the desired incoming signal. In a second approach, tunable lasers are used to send a plurality of signals, and the desired signal is detected by employing a receiver having a fixed filter. The transmission system could also employ both fixed lasers and filters. The wavelength separation capabilities of the filters for these systems needs to be on the order of tens of nanometers to as small as less then one nanometer.

The Mach-Zehnder interferometer is known for its narrowband wavelength filtering capabilities. It has been proposed that filters having pass bands as narrow as 1 nm be formed by connecting two evanescent couplers with unequal optical path lengths between them. However, it is difficult to achieve reproducibility and environmental stability with this approach, since the connecting fibers are subject to external destabilizing conditions such as temperature changes and random bending forces.

One technique for stabilizing a Mach-Zehnder interferometer is disclosed in U.S. Pat. No. 5,295,205, which is incorporated herein by reference, and commonly owned by the assignee of the present invention. As taught by this patent, the Mach-Zehnder interferometer is formed by threading first and second dissimilar optical fibers through the central bore of a continuous glass tube. The tube is evacuated and heated to collapse it onto the fibers. The tube is further heated and stretched at two spaced locations to form two couplers that are joined by the two optical fibers.

While the resulting Mach-Zehnder structure does improve the environmental stability of the optical device, this structure is still subject to thermal instability. Additionally, this structure does not allow access to the optical fibers in a region between the two coupling regions, known as the phase shift region. In view of these limitations of known Mach-Zehnder interferometers, it is desirable to provide a structure for realizing a Mach-Zehnder device which is highly insensitive to large temperature variations, or athermalized, and also allows physical access to the optical fibers within the phase shift region of the interferometer.

SUMMARY OF THE INVENTION

In accordance with the present invention, a Mach-Zehnder interferometer for performing an optical function on a plurality of optical fibers is disclosed. The interferometer includes a first cane segment surrounding the optical fibers. The first cane segment forms a first optical coupling region. The interferometer also includes a second cane segment surrounding the optical fibers. The second cane segment forms a second optical coupling region. A phase shift region is formed by a discontinuity between the first and second cane segments for exposing the optical fibers. The optical fibers are suspended between the first and second cane segments within the phase shift region. A substrate is provided for supporting the optical fibers within the phase shift region.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

FIG. 2 is a cross-sectional view of a segmented cane region taken through line 2—2 of FIG. 1;

FIG. 3 is a cross-sectional view of the phase shift region taken through line 3—3 of FIG. 1;

FIG. 4 is a cross-sectional view of the coupling region taken through line 4—4 of FIG. 1;

FIGS. 7A–7L are schematic diagrams showing the steps for producing a segmented cane interferometer in accordance with the teachings of the present invention.

DETAILED DESCRIPTION OF THE PREFERRED EMBODIMENTS

Figure 5:
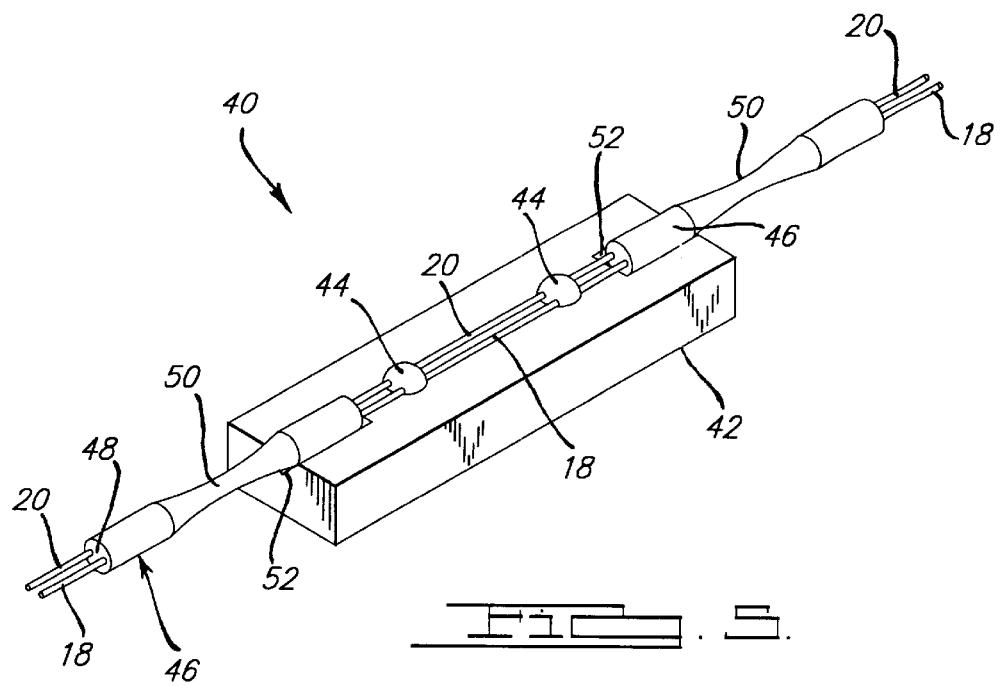
FIG. 5 is a perspective view of a segmented cane Mach-Zehnder interferometer in accordance with an alternate preferred embodiment of the present invention.

Reference will now be made in detail to the present preferred embodiments of the invention, examples of which are illustrated in the accompanying drawings. Wherever possible, the same reference numerals will be used throughout the drawings to refer to the same or like parts.

Referring now to FIG. 1, a partial sectional view of a Mach-Zehnder interferometer is shown in accordance with a preferred embodiment of the present invention. The Mach-Zehnder interferometer 10 can be designed to implement a variety of optical interference functions. As shown, the interferometer 10 generally includes a first coupler region 12, a second coupler region 14, and a phase shift region 16 formed between the first and second coupler regions 12, 14. Optical fibers 18 and 20 provide separate and continuous optical waveguides through the length of the interferometer 10.

In the prior art multi-clad Mach-Zehnder structures, the optical fibers are inserted into the central bore formed in a single tube of matrix glass, also referred to as a cane. However, according to the design of the present interferometer 10, two individual glass cane segments are used to form the coupling regions 12, 14. Thus, during the manufacturing process, each optical fiber 18, 20 is inserted through the central bore 26 of each cane segment 22, 24. Each cane segment 22, 24 is then heated for collapsing and fusing the glass material forming the cane around the optical fibers 18, 20. After the fusing process, each cane segment 22, 24 is further heated and processed in a draw apparatus, known within the art, for stretching the central portion of each cane segment 22, 24 for forming a coupling taper 28. As the optical fibers 18, 20 within each cane segment 22, 24 are heated and stretched, the cladding regions 34 of each fiber are combined and the core regions 36 of the optical fibers become optically coupled. In one exemplary application, the resulting optical coupler in each cane segment 22, 24 can be used as a 3 dB coupler for a balanced Mach-Zehnder interferometer. However, one skilled in the art will appreciate that this optical coupling structure can be used for applications other than a 3 dB coupler.

After each coupling taper 28 is formed, the first and second cane segments 22, 24 are placed within the central bore 32 of a continuous outer cane 30, having an inside diameter which is only slightly larger than the outside diameter of the cane segments 22, 24. Optionally, the first and second cane segments 22, 24 can be separated under a predetermined force for tensioning the optical fibers 18, 20 within the phase shift region 16. The first and second cane segments 22, 24 are attached to the outer cane 30 at several tacking locations 38. Tacking may be accomplished by a variety of methods which may include localized heat treatment, epoxy, or glass frit. As will be appreciated, the outer cane 30 provides mechanical support and stabilizes the cane segments 22, 24 for preventing movement of the optical fibers 18, 20 within the phase shift region 16. The outer cane 30 can be made form a material having positive thermal expansion characteristics to induce thermal effects on the interferometer. Alternatively, if it is desirable to athermalize the interferometer, the outer cane 30 can be made from a material having near zero or even negative thermal expansion characteristics.

A cross-sectional view of cane segment 22, once tacked within the outer cane 30, is shown in FIG. 2. The cane segment 22 has been collapsed around the optical fibers 18, 20 and acts as a third optical element. Therefore, it is preferable that the refractive index of each cane segment 22, 24 is lower than the refractive index of each fiber's cladding region 34. Also shown is that each optical fiber 18, 20 is held within a fixed position within the cane segment 22. However, the optical fibers 18, 20 are also separated so that their cladding regions 34 do not interact.

A cross-sectional view of the phase shift region 16 is shown in FIG. 3. Of particular interest is the air space within the central bore 32 of the outer cane 30, through which the optical fibers 18, 20 are suspended. Accordingly, the phase shift region 16 is created by a discontinuity between the first cane segment 22 and the second cane segment 24. The optical fibers 18, 20 are also separated from each other so that their cladding regions 34 do not interact.

A particular feature of this structure for fabricating a Mach-Zehnder interferometer 10 is the access provided to each optical fiber 18, 20 within the phase shift region 16. Because the optical fibers 18, 20 are suspended and left exposed, they can be further processed for changing the optical function of the interferometer 10. For example, gratings, such as diffraction gratings, may be applied to the optical fibers 18, 20 through a variety of processes such as photo-imprinting or etching. The gratings are typically applied to the optical fibers before the cane segments 22, 24 are tacked within the outer cane 30. As an example, these gratings can be fiber Bragg gratings (FBGs) which allow the Mach-Zehnder interferometer to function as a wavelength selective 4-port filter. This type of filter is also referred to as a wavelength selective add/drop filter.

A cross-sectional view of the coupling taper 28 of cane segment 24 is shown in FIG. 4. The outer cane 30 provides structural support and rigidity to the coupling taper 28, which has a smaller diameter than the ends of the cane segments 22, 24. Also shown in FIG. 4 is that the cladding regions 34 of each optical fiber 18, 20 form a common cladding region within the coupling taper 28, and that the core regions 36 of each optical fiber 18, 20 are adjacent to promote optical coupling.

When the Mach-Zehnder interferometer is used in conjunction with fiber Bragg gratings (FBGs), the outer cane 30 used to support the cane segments 22, 24 can also be used for passive control of the add/drop filter's thermal response. For instance, if a large thermal response is desired, the outer cane 30 can be fabricated from a positive thermal expansion material, such as borosilicate glass. Alternatively, if a low thermal response is desired, a negative thermal expansion material can be used. The MachZehnder interferometer would then need to be mounted under axial tension within the outer cane 30 in a manner similar to the passive athermalization of FBGs utilizing betaeucryptite substrates. Such passive athermalization is described, for example, in U.S. patent application Ser. No. 08/785,336, filed Jan. 16, 1997 and PCT Publication No. WO97/26572, both of which are hereby incorporated by reference herein and commonly owned by the assignee of the present invention.

Preferably, each of the optical fibers 18, 20 has a core region 36 surrounded by a cladding region 34 of refractive index lower than that of the core region 36. The fiber cores 36 may have similar or different refractive indices, $n_1$ and $n_1'$, and the fiber cladding regions 34 may have similar or different refractive indices, $n_2$ and $n_2'$. The refractive indices $n_3$ of each cane segment 22, 24 which encompasses the optical fibers 18, 20 is preferably less than the lowest refractive indices n of either of the fiber cladding regions 34. In addition, the bore of each cane segment 22, 24 can be provided with a conical funnel indentation (FIG. 6) at each end for facilitating the insertion of the optical fibers. The combination of the cane segment and fibers is referred to as a coupler preform. The coupler preform can be further processed in a optical fiber draw apparatus as is known within the art.

Figure 6:
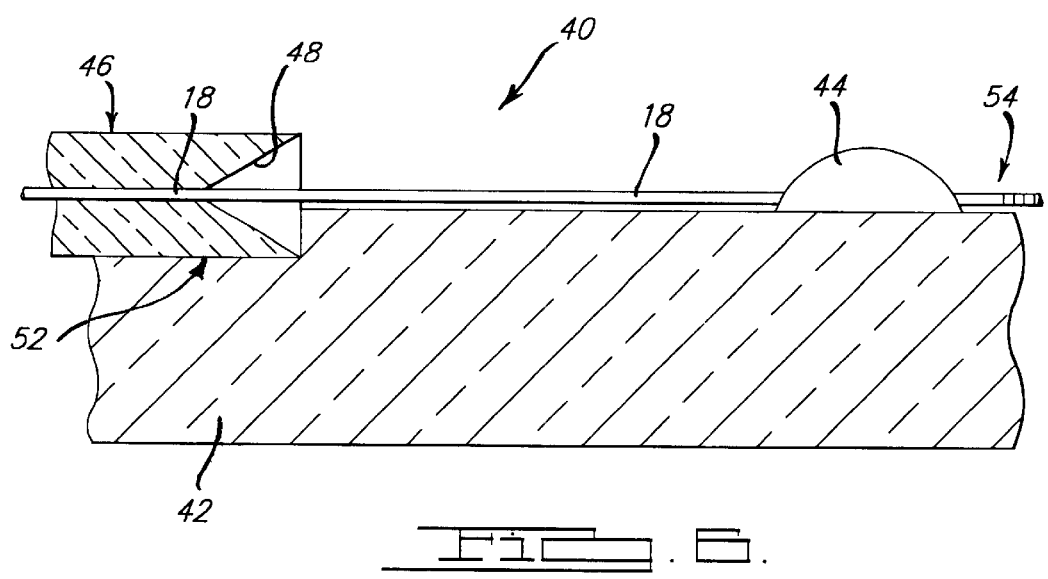
FIG. 6 is an enlarged side view of the interferometer of FIG. 5.
Figure 1H:
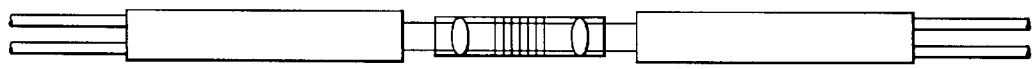
FIG. 1 is a schematic diagram of a segmented cane Mach-Zehnder interferometer in accordance with a preferred embodiment of the present invention.
Figure 1I:
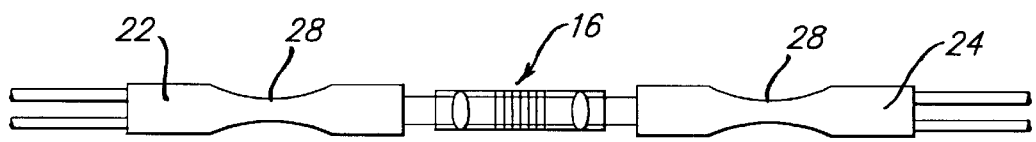
Figure 1J:
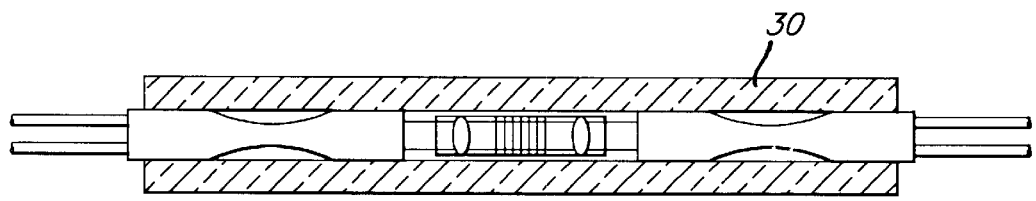
Figure 1K:
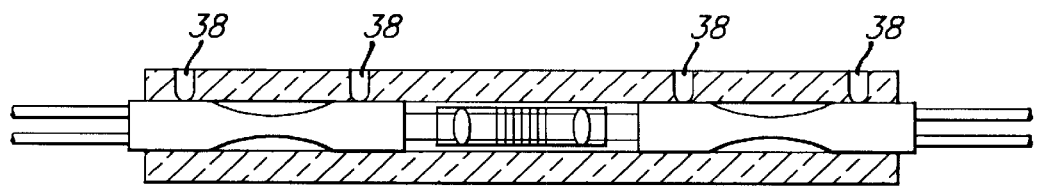
Figure 1L:
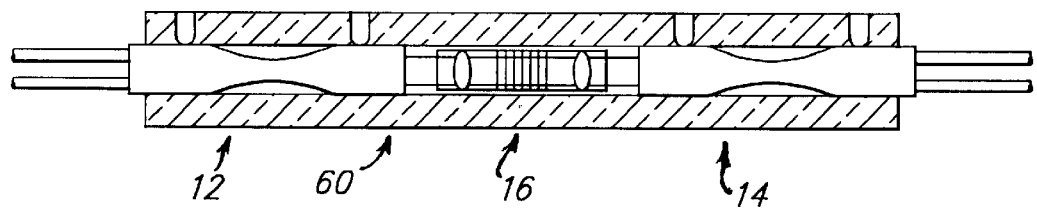

With reference to FIGS. 5 and 6, a Mach-Zehnder interferometer 40 is shown in accordance with an alternate embodiment of the present invention. The structure for interferometer 40 is similar to the structure for interferometer 10 of FIG. 1. However, the optical fibers 18, 20 of interferometer 40 are fixed to a negative thermal expansion substrate 42. The optical fibers 18, 20 are tacked to the substrate 42 at two locations using a glob of glass frit 44. While glass frit is preferred, a variety of techniques can be used for tacking the fibers to the substrate. As best shown in FIG. 6, the optical fibers 18, 20 are supported above the surface of the substrate 42 by the glass frit 44.

The structure of interferometer 40 also provides access to the optical fibers 18, 20 during the fabrication process.

Accordingly, fiber gratings 54 can be written directly to the fibers 18, 20 in the phase shift region 16 formed between the glass frit tacking locations 44. The gratings 54 are a periodic modulation of the refractive index of the optical fiber within the phase shift region. The gratings 54 function to transform a broad band Mach-Zehnder filter into a narrow band wavelength selective filter.

The coupler preforms 46 of the interferometer 40 are formed as described above. The coupler preforms 46 include conical funnels 48 at each end, which assists insertion of the optical fibers 18, 20 through the cane segments prior to tapering. Each coupler preform 46 is shown having a coupling taper 50 which is formed during the tapering process as described above. Channels 52 are formed at each end along the longitudinal axis of the substrate 42. One end of each finished coupler preform 46 is laid within its channel 52 and permanently secured, such as with epoxy or glass frit. The assembled Mach-Zehnder interferometer 40 can then be mounted within a larger surrounding structure for additional support.

A particular feature of interferometer 40 is that the fiber gratings are mounted directly to the negative thermal expansion substrate 42. Therefore, the fiber gratings are structurally isolated from each of the coupler cane segments 46, and are not affected by any thermal expansion of the coupler cane segments 46.

Turning now to FIGS. 7A–7L, the steps for fabricating an athermalized Mach-Zehnder interferometer having Bragg gratings formed within the phase shift region are disclosed. The interferometer 60 depicted in these steps is an interferometer filter fabricated using the segmented cane structure discussed above. The purpose of this fabrication technique is to mount the portion of the optical fibers 18, 20 having the gratings onto a negative expansion substrate 42 so that changes in temperature do not affect the operation of the gratings. The coupler preforms 46 and athermalized grating substrate 42 can then be mounted within an outer cane for additional support. While the preferred steps for fabricating this alternate embodiment of the interferometer are shown, one skilled in the art will appreciate that other fabrication techniques are possible, and within the scope of the present invention.

FIG. 7A shows two optical fibers 18, 20 with their protective coating 62 intact.

The fibers can be one of a variety of optical fibers including reference numbers SMF-28, CS980, or high delta optical fiber, all manufactured by Corning, Inc. Moreover, other optical fibers not specifically mentioned may also be used, as the process of the present invention is not limited to a specific type of optical fiber. As part of the step illustrated in 30 FIG. 7A, the optical fibers are hydrogen loaded. The step of hydrogen loading is one method used to increase the photosensitivity of the constituent optical fibers.

FIG. 7B shows the step of stripping the protective coating 62 off of both optical fibers 18, 20 over a desired length. The protective coating is stripped over a mid-portion of the optical fibers which will be contained within the resulting interferometer 60. In FIG. 7C, the optical fibers 18, 20 are shown as being inserted through the central bore of two coupler cane segments 22, 24 which are spaced apart from one another. The spacing between the coupler cane segments 22, 24 is dependent upon the grating length for the particular interferometer. The length of each coupler cane segment depends upon the particular interferometer application. Preferably, the central bore of each cane segment 22, 24 has an inside diameter of about 265 micrometers, and an outside diameter of about 2.65 millimeters. Each cane segment 22, 24 is shown to include a conical funnel 48 at each end.

FIG. 7D shows the step of attaching both optical fibers 18, 20 to side A of a negative expansion substrate 42 using a single glob of glass frit 44. The preferred negative thermal expansion substrate 42 for the interferometer of the present invention is formed from beta-eucryptite, which has desirable negative thermal expansion characteristics. In FIG. 7E, the two optical fibers are lightly tensioned, and maintained under tension for further processing.

In FIG. 7F, identical gratings 54 are simultaneously written on both optical fibers 18, 20 using a single iteration of a grating writing process. The gratings 54 shown in FIG. 7F are shown simultaneously across both fibers to indicate that the position of the gratings along each fiber are identical. FIG. 7G illustrates the step of tension tuning the two gratings 54 on the optical fibers 18, 20 and attaching the optical fibers to side B of the negative expansion substrate 42 using another glob of glass frit 44. It should be noted that the optical fibers 18, 20 are maintained slightly above the surface of the substrate by the glass frit 44. Thus, the globs of glass frit 44 form support structures for the optical fibers 18, 20. In FIG. 7H, the assembly is annealed through a heating process to out-gas any remaining hydrogen within the silica forming the various optical components.

In FIG. 7I, each coupler cane segment 22, 24 is heated and tapered for defining an interferometric optical coupling taper 28. The coupling taper 28 may be formed using Multi-Clad™ coupler draw techniques. Generally, the coupling taper is formed by heating a central portion of the cane segment 22, 24 and drawing the ends of the cane segment apart. FIG. 7J illustrates the assembly comprising both coupler cane segments and the substrate inserted within a supporting glass tube 30. In FIG. 7K, the support tube 30 is attached to the coupler cane segments 22, 24 at various tacking locations 38 using any number of attachment techniques described above. Finally, in FIG. 7L, the optical characteristics of the interferometer 60 can be optimized by UV trimming the individual optical fiber path lengths. Thus, the resulting interferometer 60 also includes first and second coupling regions 12, 14 formed by cane segments 22, 24, and a phase shift region 16 with athermalized gratings 54 disposed between the cane segments 22, 24.

The Mach-Zehnder interferometers 10, 40, 60 of the present invention can be used for various optical applications including gain-flattening filters for erbium-doped fiber amplifiers and wavelength selective add/drop filters. Additionally, several interferometers can be cascaded together for designing and/or implementing various optical functions. To allow more functionality, access to the constituent optical fibers between the coupling regions 12, 14 is desired so that the optical fibers can be modified, such as by writing photo-induced gratings, for example. Accordingly, one skilled in the art will appreciate that the present design of the Mach-Zehnder interferometer 10 provides this requisite access to the optical fibers within the phase shift region 16 during the fabrication process.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An interferometer for performing an optical function on a plurality of optical fibers comprising:

a first cane segment surrounding the optical fibers, the first cane segment forming a first optical coupling region;

a second cane segment surrounding the optical fibers, the second cane segment forming a second optical coupling region; and a phase shift region formed by a discontinuity between the first and second cane segments for exposing the optical fibers, the optical fibers being suspended between the first and second cane segments within the phase shift region.

2. The interferometer of claim 1 further including a substrate for supporting the optical fibers within the phase shift region.

3. The interferometer of claim 2 wherein the optical fibers are secured to the substrate at a first tacking location and a second tacking location.

4. The interferometer of claim 3 wherein the first tacking location and the second tacking location are formed by glass frit which surrounds the optical fibers.

5. The interferometer of claim 3 wherein the optical fibers are tensioned between the first and second tacking locations.

6. The interferometer of claim 2 further including an outer cane which surrounds the first cane segment, the second cane segment, the phase shift region, and the substrate for providing structural integrity to the interferometer.

7. The interferometer of claim 1 wherein Bragg gratings are written to the optical fibers within the phase shift region.

8. The interferometer of claim 1 wherein the first and second cane segments include a coupling taper formed in a central portion of each cane segment.

9. The interferometer of claim 8 wherein the coupling taper forms a 3 dB optical coupler.

10. The interferometer of claim 1 wherein the first and second cane segments are axially aligned with the phase shift region.

11. The interferometer of claim 2 wherein the substrate is a negative thermal expansion material.

12. The interferometer of claim 2 wherein the substrate is beta eucryptite.

13. A Mach-Zehnder interferometer comprising:

a first optical fiber;

a second optical fiber;

a first coupling region surrounding the first and second optical fibers, the first coupling region including a coupling taper formed in a central portion thereof;

a second coupling region surrounding the first and second optical fibers, the second coupling region including a coupling taper formed in a central portion thereof;

a phase shift region disposed between the first and second coupling regions; and an outer cane portion which encircles the first coupling region, the second coupling region and the phase shift region, the outer cane portion maintaining the axial alignment of the first and second coupling regions with the phase shift region.

14. The interferometer of claim 13 wherein Bragg gratings are written to the optical fibers within the phase shift region.

15. The interferometer of claim 13 wherein the phase shift region is formed by a discontinuity between the first and second coupling regions.

16. The interferometer of claim 13 wherein at least one of the coupling tapers forms a 3 dB optical coupler.

17. The interferometer of claim 13 wherein the outer cane portion is formed from beta-eucryptite.

18. A method for forming an interferometer having at least first and second optical fibers comprising:

forming a first optical coupling region surrounding the optical fibers;

forming a second optical coupling region surrounding the optical fibers;

forming a phase shift region between the first and second coupling regions; and securing the optical fibers to a substrate.

19. The method of claim 18 further including the step of forming gratings on the optical fibers within the phase shift region.

20. The method of claim 18 wherein the steps of forming the first and second coupling regions further include the step tapering a central portion of each coupling region.

21. The method of claim 18 further including the step of encapsulating the first optical coupling region, the second optical coupling region, and the phase shift region within an outer substrate.

22. The method of claim 18 further including the step of hydrogen loading the optical fibers.

23. The method of claim 18 wherein the step of securing the optical fibers to the substrate includes applying a glass frit material to a surface of the substrate and placing the optical within the glass frit material.

* * * * *

UNITED STATES PATENT AND TRADEMARK OFFICE
CERTIFICATE OF CORRECTION

PATENT NO. : 6,278,821 B1
DATED : August 21, 2001
INVENTOR(S) : Carberry et al.

It is certified that error appears in the above-identified patent and that said Letters Patent is hereby corrected as shown below:

<u>Title page,</u>
Item [56], the References Cited section should include U.S. PATENT DOCUMENTS:

| | | | | |
|---|---|---|---|---|
| -- | 5,682,445 | 10/1997 | Smith | 385/7 |
| | 5,805,752 | 09/1998 | Campbell, Jr. et al | 385/51 |
| | 5,809,190 | 09/1998 | Chen | 385/43 |
| | 6,031,948 | 02/2000 | Chen | 385/24 -- |

Item [56], and FOREIGN PATENT DOCUMENTS should include:

| | | | |
|---|---|---|---|
| -- | 91120225.7 | 11/27/1991 | Europe |
| | 95402261.2 | 10/09/1995 | Europe |
| | 9505999 | 05/19/1995 | France -- |

Signed and Sealed this

Sixth Day of August, 2002

Attest:

JAMES E. ROGAN
Attesting Officer   Director of the United States Patent and Trademark Office